Patented May 25, 1937

2,081,886

UNITED STATES PATENT OFFICE 2,081,886

OIL COMPOSITION

Bertrand W. Story and Everett W. Fuller, Woodbury, N. J., assignors, by mesne assignments, to Socony-Vacuum Oil Company, Incorporated, a corporation of New York No Drawing. Application June 10, 1931, Serial No. 543,396

1 Claim. (Cl. 87—9)

This invention relates to the stabilization of viscous mineral oils, such as transformer oils and lubricants, which have been highly refined as by the use of large quantities of sulphuric acid including fuming acid.

Various organic hydrocarbons, either with or without a nitrogen or hydroxyl group, have been proposed as inhibitors of oxidation for petroleum oils. On the other hand, sulphur-containing compounds have generally been looked upon as having an opposite tendency, although it has been known that a highly refined oil that is very susceptible to oxidation can be stabilized to some extent by treating it with a small amount of sulphur. It has also been deemed necessary to eliminate sulphur from oils, such as transformer oils, which are to be used in contact with copper or other metals which have an affinity for sulphur.

We have discovered, however, that disulphides of organic compounds are particularly effective in stabilizing highly refined mineral oils against the formation of acidic materials through oxidation, and that, when used in the small quantities which are sufficient for this purpose, these disulphides have little or no tendency to attack copper. The present invention consists, therefore, in the addition of one or more of such disulphides to a highly refined viscous mineral oil, in the amount necessary to reduce substantially the tendency of the oil to acid formation.

So far as we know, all disulphides of organic compounds have the described characteristic, though in varying degrees. The following table shows the effect, upon a highly refined viscous oil which normally gave 14.72% of acid extract after an oxygen-absorption test, of the addition of designated small amounts of various organic disulphides, the effect being indicated by the reduced amounts of acid extract. The oil in question was refined by successive treatments with 25 pounds of 93.19% sulphuric acid, 25 pounds of 98% sulphuric acid, and about 250 pounds of 104% sulphuric acid per barrel, followed by neutralization and contact with clay.

| Disulphide | Quantity | Acid extract |
|---|---|---|
| Dibenzyl | .05 | .08 |
| Dibenzyl | .01 | 5.72 |
| Di-isoamyl | .05 | .07 |
| Tetra-methyl-thiuram | .03 | .03 |
| Tetra-methyl-thiuram | .005 | .95 |
| Di-n-butyl | .10 | .02 |
| Diethyl | .10 | .02 |
| Diphenyl | .10 | 5.10 |

In this table the amounts are specified as percentages of the weight of the refined oil.

When the refined oil is such as gives, without the addition of the disulphide, a smaller acid extract than the 14.72% above specified, a smaller addition of the stabilizing material suffices to reduce the oxidizing tendency to a low figure. For example, in the case of an oil which normally gave 2.94% of acid extract, the addition of .01% of dibenzyl disulphide or .001% of tetra-methyl thiuram disulphide reduced the acid extract to .12% or less.

The tests upon which the foregoing examples are based were made as follows: a sample of the oil was maintained at a temperature of 120° C. and oxygen gas bubbled through it slowly for 70 hours. The sample was then extracted with alcoholic soda solution, and the extracted material was precipitated by means of an acid, and dried and weighed. The weight of acid extract varies directly with the susceptibility of the oil to acid formation under the condition of the described test.

The disulphide may be added to the oil either as a separately prepared material, or as the result of a reaction produced by adding a suitable compound to the oil and then treating the mixture to convert the added compound to a disulphide. For example, amyl mercaptan may be added, and the mixture then treated with sodium plumbite solution and sulphur.

Among the disulphides specifically mentioned above, tetra-methyl-thiuram disulphide and dibenzyl disulphide are those which are, at the same time, highly effective and most conveniently available, while they have the low vapor tension which is necessary to avoid loss of the stabilizing material when the oil is heated to a high temperature. The tetra-methyl-thiuram disulphide has a slight tendency to corrode copper, however, so that the dibenzyl disulphide is preferable for some uses, notwithstanding its less powerful effect.

The invention claimed is:

The combination, with a highly refined viscous mineral oil, of a relatively small quantity of dibenzyl disulphide sufficient to reduce substantially the tendency of the oil to form acidic material through oxidation.

BERTRAND W. STORY.
EVERETT W. FULLER.